R. L. MOORE.
GARDEN PLOW.
APPLICATION FILED JUNE 12, 1911.

1,001,974.

Patented Aug. 29, 1911.

UNITED STATES PATENT OFFICE.

ROBERT L. MOORE, OF MERKEL, TEXAS.

GARDEN-PLOW.

1,001,974.  Specification of Letters Patent.  Patented Aug. 29, 1911.

Application filed June 12, 1911. Serial No. 632,687.

*To all whom it may concern:*

Be it known that I, ROBERT L. MOORE, a citizen of the United States, residing at Merkel, in the county of Taylor and State of Texas, have invented or discovered certain new and useful Improvements in Garden-Plows, of which the following is a specification, reference being had therein to the accompanying drawings.

This invention has for its object to provide a garden plow or cultivator, adapted to be used as a hand implement, which will be of such construction that it will be very strong in proportion to its weight, which will be inexpensive to make, and which, by an adjustment of certain parts thereof, will be adapted for use either as a plow, a cultivator, or a seed coverer. To this end the improved implement will preferably be constructed entirely of metal, and will be provided with three working shovels or parts the two outer ones of which are carried by pivoted arms so that they may be swung up out of the way when not in use, and the central one of which may be detached or lifted up out of the way when the outer ones alone are to be used.

Figure 1:
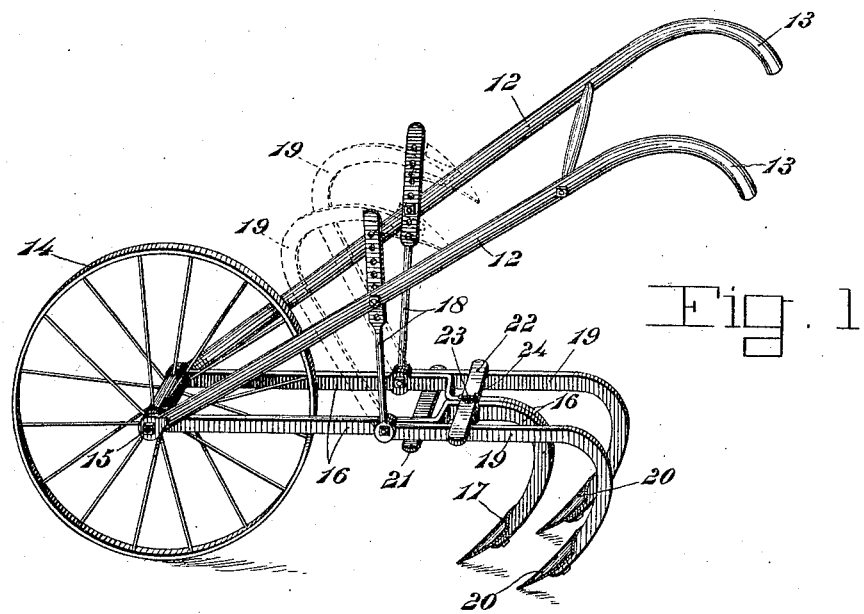
Figure 2:
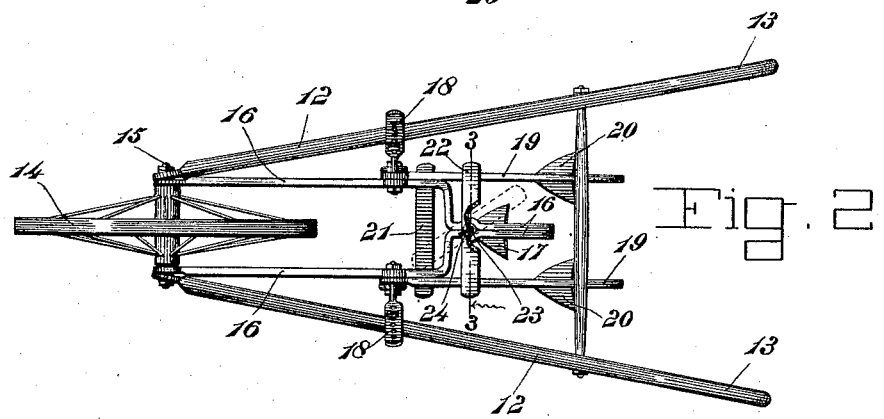
Figure 3:
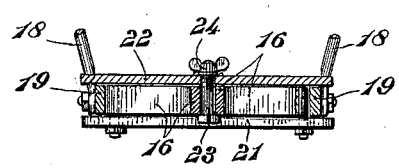

In the accompanying drawings Figure 1 is a perspective view of the improved implement. Fig. 2 is a plan view of the same. Fig. 3 is a detail cross section on line 3—3, Fig. 2.

Referring to the drawings, 12 denotes the handles of the implement, said handles being provided with bent rear portions 13 of convenient construction to be grasped by the user. These handle portions are preferably made from tubular iron or steel, so as to be both light and strong, and are flattened at their lower forward ends between which the wheel 14 is mounted, said wheel turning on a suitable bolt 15 which serves as an axle therefor. The said bolt passes through the lower forward ends of parallel bars 16, which embrace the wheel 14 at their forward ends, said bars being bent so as to come closely together at their rear ends which are turned downward and support the central shovel or plow 17, which is detachably secured thereto. The bars 16 are adjustably connected with the handles 12 by upright bars 18 which are jointed at their lower ends to the bars 16 adjustably connected at their upper ends with the handle bars 12 by reason of the fact that the upper portions of said bars 18 are provided with a series of holes through any of which the bolts, attaching them to the handle bars 12, may pass. Also pivotally attached to the bars 16 are swinging arms 19 to the free ends of which are attached the outer teeth or shovels 20. When the said outer teeth or shovels are in working position, said arms 19 will rest on the outer ends of a cross bar 21 which is welded or otherwise permanently attached to the bars 16; and the said arms 19 will be engaged on their upper sides, to hold the teeth or shovels 20 in working position, by the cross bar or button 22 mounted between the bars 16 and held in place by a bolt 23 provided with a suitable thumb nut 24 which may be tightened on the said bolt to hold the said cross bar or button 22 in place as shown in Fig. 1, to retain the said arms 19 in working position; or when said cross bar or button is not in use, for the purpose just stated, it may be turned around parallel with the bars 16, if desired, and tightened in place. The handle bars 12 are braced by a suitable cross bar 25.

If it be desired to use the implement as a hand plow, only, the arms 19 will be released from engagement with the cross bar or button 22, and will be turned over until they rest against the converging sides of the handle bars 12, where they will remain in place. This non-working position of one of the arms 19 is denoted by dotted lines in Fig. 1.

If it be desired to use the implement as a cultivator, with all the plows or teeth in operative position, the arms 19 will be secured in place, as shown in full lines in Fig. 1, by the cross bar or button 22 and the bolt and thumb nut by which the said cross bar or button is fastened.

If it be desired to utilize the outer teeth or shovels as a coverer, to throw dirt into a furrow containing seed, and which may be straddled by the teeth or shovels 20, the plow or shovel 17 may be removed from the bars 16, or may be lifted slightly clear of the ground by raising the said bars.

It will therefore be understood that the improved implement, which is strong and durable as well as comparatively light, may be used for a variety of purposes; and as it will preferably contain no wood in its construction, it will not warp or deteriorate when exposed to the weather.

Having thus described my invention I claim and desire to secure by Letters Patent:

1. A hand plow or cultivator comprising three working teeth or shovels, pivoted arms by which the two outer teeth or shovels are carried, parallel bars to which the said arms are pivotally attached, and which parallel bars are downwardly bent, a central tooth or shovel attached to the downwardly bent portions of said parallel bars, forwardly converging handle bars with which the said parallel bars are adjustably connected vertically, a wheel mounted between the forward ends of said handle bars, and means for securing said pivoted arms in working position but permitting them to be released and lifted out of the way when desired.

2. A hand plow or cultivator comprising three working teeth or shovels, pivoted arms by which the two outer teeth or shovels are carried, parallel bars to which the said arms are pivotally attached, and which parallel bars are downwardly bent, a central tooth or shovel attached to the downwardly bent portions of said parallel bars, forwardly converging handle bars with which the said parallel bars are adjustably connected vertically, a wheel mounted between the forward ends of said handle bars, and means for securing said pivoted arms in working position but permitting them to be released and lifted out of the way when desired, said means comprising a permanently attached cross-bar, as 21, on which the said arms may rest, a movably mounted cross-bar or button, as 22, and a securing bolt for said cross-bar or button.

In testimony whereof I affix my signature, in presence of two witnesses.

ROBERT L. MOORE.

Witnesses:
W. T. POTTER,
F. F. CLARK.

---

Copies of this patent may be obtained for five cents each, by addressing the "Commissioner of Patents, Washington, D. C."